Nov. 8, 1955

W. C. SEALEY 2,723,352

POLYPHASE REGULATING SYSTEM FOR
OBTAINING BALANCED VOLTAGES

Filed April 22, 1953

Inventor
William C. Sealey
by Didier Jurneaux
Attorney

Nov. 8, 1955

W. C. SEALEY 2,723,352

POLYPHASE REGULATING SYSTEM FOR
OBTAINING BALANCED VOLTAGES

Filed April 22, 1953

Inventor
William C. Sealey
by Didier Journeaux
Attorney

Nov. 8, 1955 W. C. SEALEY 2,723,352
POLYPHASE REGULATING SYSTEM FOR
OBTAINING BALANCED VOLTAGES
Filed April 22, 1953 5 Sheets-Sheet 3

Inventor
William C. Sealey
by Didier Journeaux
Attorney

United States Patent Office 2,723,352
Patented Nov. 8, 1955

2,723,352

POLYPHASE REGULATING SYSTEM FOR OBTAINING BALANCED VOLTAGES

William C. Sealey, Wauwatosa, Wis., assignor to Allis-Chalmers Manufacturing Company, Milwaukee, Wis.

Application April 22, 1953, Serial No. 350,441

14 Claims. (Cl. 307—14)

This invention relates in general to polyphase regulating systems and more particularly to an improved regulating system for obtaining balanced voltages in a polyphase load circuit by means of step type voltage regulators.

Polyphase voltage supply systems, such as three phase voltage distribution systems are often referred to as balanced or unbalanced systems, a balanced system being one in which the magnitudes of all phase voltages are equal, and the phase angles between successive phases are also equal. The voltage at the source of supply in both kinds of systems is most always generated in a balanced state. However, the polyphase voltage at a point distant from the supply does not always maintain its original balanced condition. One reason for this unbalance occurring is that the conductors from the generating source are usually not symmetrically located with respect to each other which results in at least one of the phases being altered. Also, where large single phase loads are connected to one phase of a three phase circuit an unbalance in voltage is likely to occur.

The need for maintaining the circuit balanced arises when it is desired to connect a polyphase load to the system. If a polyphase load such as a three phase motor or a synchronous converter is connected to an unbalanced circuit circulating currents flow in the load which, if the unbalance is severe, may cause serious damage to the load.

It has been found that balanced polyphase voltages may be obtained from an unbalanced polyphase supply circuit by means of apparatus commonly referred to as step type voltage regulators. As is well known, this type of regulator has a winding across which the voltage may be varied in predetermined steps by operation of a tap changing switch.

According to the present invention balanced voltages are obtained in a three phase load circuit by connecting one load conductor directly to a supply conductor, a second load conductor to a second supply conductor through a first variable voltage winding of one phase, and a third load conductor to a third supply conductor through two other variable voltage windings of two other phases in series. Voltages across these windings are varied by means of tap changers which are suitably controlled in response to the condition of the load circuit. By varying the voltage across the first winding the voltages between the first and second load conductors and between the second and third load conductors are changed. By varying the voltage of either of the other two windings the voltages between the second and third load conductors and between the first and third load conductors are changed. The phase voltage between the first and second load conductors therefore is regulated by only the voltage supplied by the first voltage varying winding and is independent of the regulation of the other two phases.

It is therefore an object of the present invention to provide an improved polyphase voltage regulating system.

Another object of the present invention is to provide an improved regulating system having apparatus to obtain balanced voltages in the polyphase load circuit and maintain these balanced voltages regardless of changes of conditions in the supply circuit.

A further object of the present invention is to provide an improved regulating system having apparatus which may be automatically controlled so as to obtain balanced voltages in the load circuit and maintain these balanced voltages regardless of changes and conditions of the supply circuit.

A still further object of the present invention is to provide an improved regulating system for a polyphase load circuit in which one phase of the load circuit is regulated independently of the voltage regulation of the other two phases.

A still further object of the present invention is to provide an improved regulating system in which balanced voltages in a polyphase load circuit are automatically obtained and are maintained with the least operation of the apparatus.

Objects and advantages other than those mentioned above will become apparent from the following description when read in connection with the drawings in which.

Figure 1:
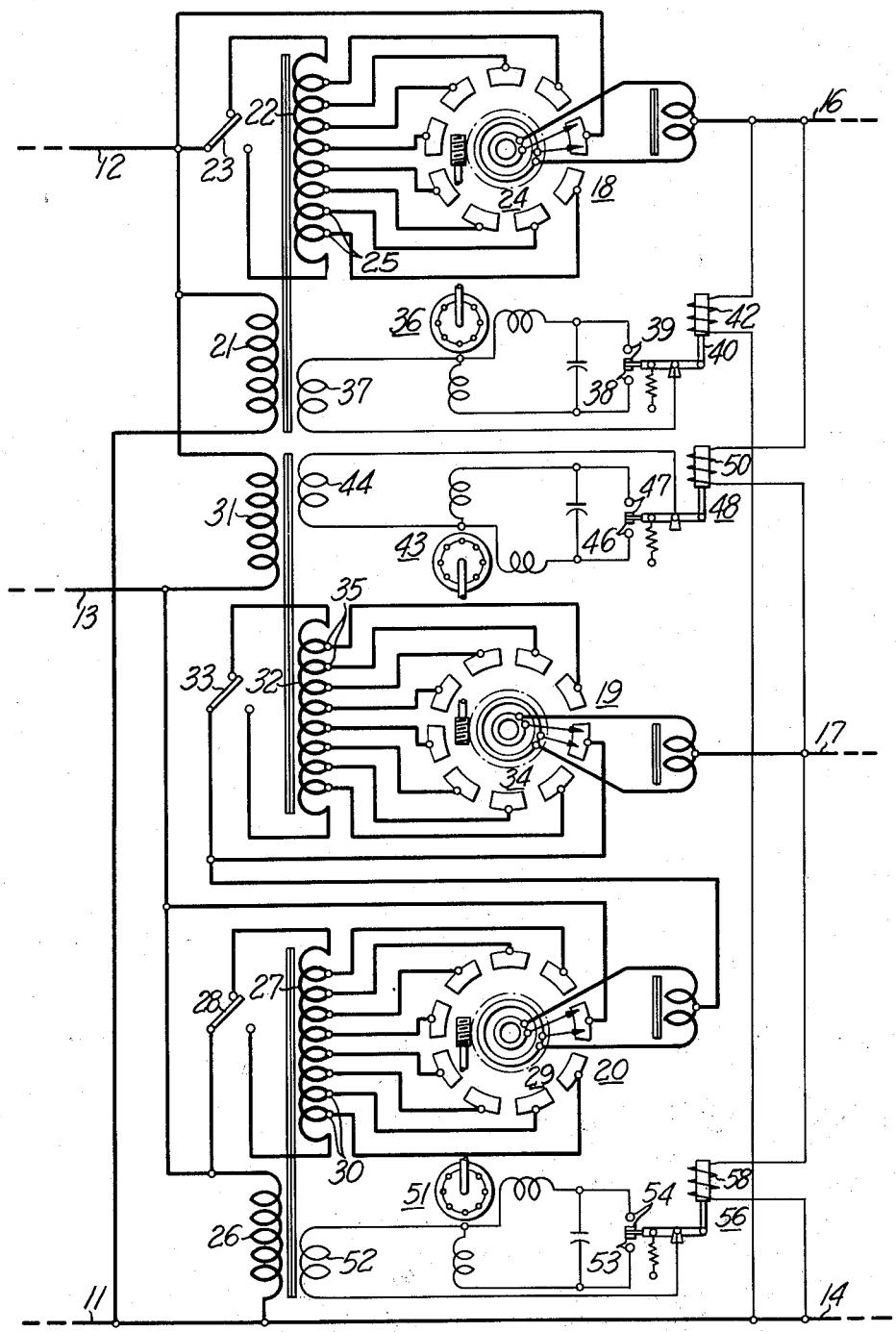
Fig. 1 is a diagrammatic view of a polyphase regulating system embodying the present invention.

Referring to the drawing, the voltage regulating system shown in Fig. 1 comprises generally a three phase supply circuit, a three phase load circuit and regulators interconnecting these circuits. The regulators shown are of the general type referred to in the art as step type regulators and are shown as being operated by reversible motors but if desired may also be operated manually.

Figure 2:
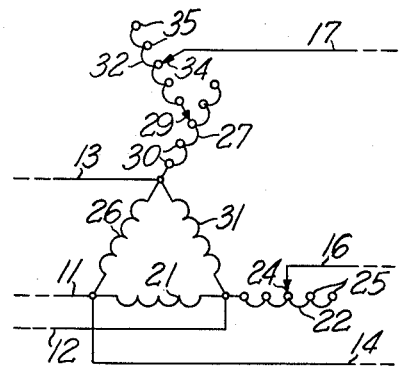
Fig. 2 is a diagram of the system shown in Fig. 1 with the circuit for automatic operation omitted.

The three phase supply circuit comprises conductors 11, 12 and 13 which are connected to a source (not shown) of three phase voltage. The conductors 11, 12, 13 are assumed to be so remote from the source of supply that unbalanced load currents may cause in the conductors voltage drops which appreciably unbalance the voltages between conductors. The three phase load circuit comprises conductors 14, 16 and 17, across which a load (not shown) may be connected. These circuits are interconnected by regulator means of conventional construction having three series windings and exciting winding means so connected to the source that the voltages of at least two series windings are of different phase. In Fig. 1 the regulator means consists of three duplicate regulators 18, 19 and 20. Regulator 18 has an exciting winding 21 connected across conductors 11, 12 and a series winding 22 connected to conductor 12 through a reversing switch 23. As shown in the drawing, the voltage across the series winding may be varied in any suitable known manner, as by a tap switch connected to a plurality of taps on the series winding, or the voltage may be varied by inductively connecting the series winding to an auxiliary winding which is connected to taps on the exciting winding through the tap switch; or by having a tapped auxiliary winding inductively connected to the exciting winding and a second auxiliary winding inductively connected to the series winding, the auxiliary windings then being connected together through the tap switch. As shown in Figs. 1 and 2, the voltage across series winding 22 is varied by tap switch 24 connected to taps 25 on the series winding 22. Reversing switch 23 is reversed by movement of tap switch 24 when the latter passes through the zero voltage tap position to enable the tapped winding to buck or boost the supply voltage.

Similarly, regulator 20 has an exciting winding 26, a series winding 27, reversing switch 28 and a tap switch 29 connected to taps 30 on winding 27.

Regulator 19 has an exciting winding 31, a series winding 32, a reversing switch 33 and a tap switch 34 connected to taps 35 on winding 32.

Supply conductor 11 is directly connected to load conductor 14, that is without interposition therebetween of any series regulating winding. Supply conductor 12 is connected to load conductor 16 through reversing switch 23, a series winding 22 and tap switch 24 of regulator 18. Supply conductor 13 is connected to load conductor 17 through reversing switch 28, series winding 27 and tap switch 29 of regulator 20 in series with reversing switch 33, series winding 32 and tap switch 34 of regulator 19.

If automatic operation of the system is desired it may be accomplished by utilizing motor operated tap switches, the motors being selectively energized by control circuits including electroresponsive devices operable to energize the motors in response to predetermined changes of the load circuit.

If desired, a time delay mechanism may be used in cooperation with the motor so that the motor is energized only for unbalanced conditions which are more than momentary fluctuations of load voltage. As shown in Fig. 1 tap switch 24 of regulator 18 is actuated by reversible motor 36. Motor 36 has its windings energized from winding 37 which is shown inductively connected to exciting winding 21 of regulator 18, but may be connected to any suitable source of voltage. Selective energization of the windings of motor 36 is accomplished through either contacts 38 or contacts 39 of an electroresponsive device, such as a solenoid 40. Device 40 has a core movable to selectively actuate contacts 38 and 39 in response to the voltage of coil 42 connected across load conductors 14, 16. As shown, coil 42 is connected directly across load conductors 14, 16 but may also be connected through a suitable transformer.

Similarly, tap switch 34 of regulator 19 is actuated by reversible motor 43 energized from winding 44 through either contacts 46, or contacts 47 of electroresponsive device or solenoid 48. Device 48 has a core and a coil 50 connected across load conductors 16, 17.

Tap switch 29 of regulator 20 is actuated by reversible motor 51 energized from winding 52 through contacts 53, 54 of electroresponsive device or solenoid 56. Device 56 has a core and a coil 58 connected across load conductors 14, 17.

Referring to Fig. 2 the system of Fig. 1 is shown diagrammatically but the circuits which include the reversible motors and electroresponsive devices used for automatic operation of the system have been omitted for clearness. However, any of the modifications of Fig. 1 shown diagrammatically in Figs. 2 and 4 to 14 may include the control circuits shown in Fig. 1.

Figure 3:
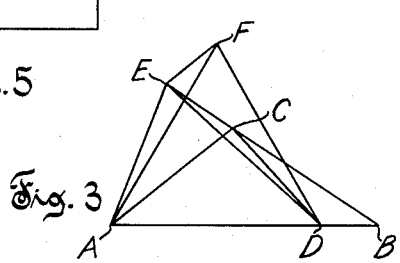
Fig. 3 shows vectorially the operation of the system shown in Fig. 1.

The operation of the system shown in Figs. 1 and 2 may be explained as follows:

Assume that automatic operation is desired and the electroresponsive devices are set to maintain respective phases of the load voltage at a predetermined value. Further assume that the tap switches are initially at the zero tap position as shown and the supply circuit is energized. The load voltage therefore corresponds substantially to that of the supply. This condition persists as long as the supply voltage is balanced at the desired value. If the voltage is disturbed by the flow of unbalanced load current, the new condition is shown vectorially in Fig. 3 where vector AB represents phase A of the supply voltage applied to exciting winding 21 of regulator 18, vector BC represents phase B of the supply voltage applied to exciting winding 31 of regulator 18 and vector CA represents phase C of the supply voltage applied to exciting winding 26 of regulator 20.

Devices 40, 48 and 56 are set so as not to operate in response to voltages having the same predetermined value represented by the length of the vector AD, and to operate in response to departure of the load voltages from the predetermined value to a predetermined extent. Solenoid 40 operating in response to voltage AB, closes contacts 38, causing the windings of the motor 36 to be energized from winding 37. Energizing of motor 36 causes tap switch 24 to operate causing a voltage to be supplied to series winding 22 which is in phase with voltage represented by vector AB and in the present case is in opposition thereto, reversing switch 23 being suitably positioned by tap switch 24. Tap switch 24 increases the voltage across series winding 22 until it reaches the value represented by vector BD. On reaching this value the voltage across lines 14, 16 has the required value and contacts 38 open, causing the motor 36 to be deenergized.

The voltage between conductors 16, 17, phase B of the load circuit, is dependent upon the voltage across series winding 22, therefore the voltage of phase B is represented by vector DC. Since vector DC is smaller than vector AD, solenoid 48 operating in response to the difference of their values closes contacts 47, causing the winding of motor 43 to be energized from winding 44. Energizing motor 43 causes tap switch 34 to move, resulting in a voltage being supplied to series winding 32 which is in phase with the voltage BC of exciting winding 31 and in the present case is in additive relation thereto, reversing switch 33 being suitably positioned by tap switch 34. Tap switch 34 increases the voltage across series winding 32 until the voltage across conductors 16, 17 reaches the predetermined value, represented by vector DE. Vector DE represents the voltage across conductors 16, 17 and comprises the vector sum of voltages DB, BC and CE.

The initial voltage across conductors 14 and 17, phase C of the load, is represented by vector CA and is not changed by the voltage BD across series winding 21. However, the phase C load voltage is dependent on the voltage of series winding 32 of regulator 19 and hence is changed when correction for phase B of the load is made, as is shown by the vector EA of Fig. 3. Phase C of the supply, represented by the vector CA, maintains its initial relationship with regard to the other supply phases.

Since the phase C load voltage EA is smaller than the desired voltage, solenoid 56 operates in response to this difference, closing contacts 53 causing the windings of motor 51 to be energized from winding 52. Energizing motor 51 causes tap switch 29 to move, resulting in a voltage being supplied to series winding 27 which is in phase with voltage CA of exciting winding 26 and in additive relation thereto, reversing switch 28 being suitably positioned by tap switch 29. Tap switch 29 continues to increase the voltage FE across series winding 27, until the voltage across conductors 14, 17 reaches its predetermined value as shown by vector FA in Fig. 3. Vector FA represents the vector sum of the voltages across conductors 14 and 17 and comprises vectors FE, EC and CA.

The voltage of phase B across conductors 16 and 17 is thereby changed again since the voltage EF across series winding 27 is also supplied between these conductors. The voltage DF comprises voltage DE plus the voltage EF but since these voltages are approximately 60° displaced the magnitude of voltage DE is practically the same as the voltage DF. As a result device 48 does not respond.

If, however, the voltage FE causes the voltage DE to change appreciably in magnitude the operation of the system is substantially the same as before with devices 48, 56 initiating the correction required to obtain the desired balance. On reaching a balanced state the system remains balanced until the three phase supply voltage reaches an unbalance and then the operation described above is repeated.

Figure 4:
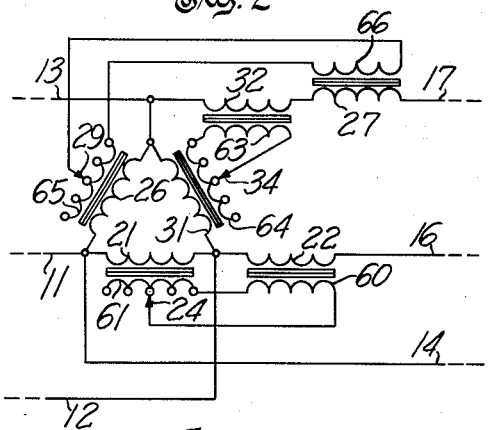

The system shown diagrammatically in Fig. 4 is similar to the system shown in Fig. 2 except for the arrangement of the means used to vary the voltages of the series windings. In Fig. 4 the voltage across series winding 22 is varied by having a first auxiliary winding 60 inductively connected to series winding 22 and a second auxiliary winding 61 inductively connected to exciting winding 21. As shown, tap switch 24 interconnects these auxiliary windings through taps on winding 61 but if desired the taps may be on winding 60. The voltage across series winding 32 is varied by tap switch 34 interconnecting auxiliary winding 63 which is inductively connected to winding 32 and auxiliary winding 64 which is inductively connected to exciting winding 31. The voltage across series winding 27 is varied by a tap switch 29 interconnecting auxiliary winding 66 which is inductively connected to series winding 27 and auxiliary winding 65 which is inductively connected to exciting winding 26.

Figure 5:
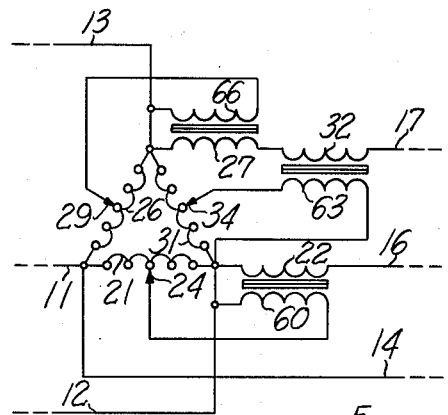

The system shown diagramatically in Fig. 5 is similar to that of Fig. 4 except that the auxiliary windings 61, 64 and 65 which are inductively connected to exciting windings 21, 31 and 26, respectively, have been eliminated. Tap switches 24, 34, and 29 are then connected directly to taps on the exciting windings 21, 31 and 26, respectively.

The operation of the systems shown in Figs. 4 and 5 is substantially the same as for the system shown in Figs. 1 and 2.

Figure 6:
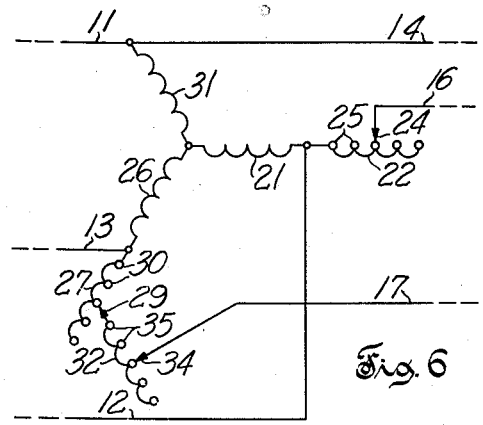
Figs. 4 to 14 are similar to Fig. 2 but show diagrammatically various modifications of the system of Fig. 1.

The system shown in Fig. 6 is similar to that shown in Fig. 2, except that the exciting windings are connected in star rather than in delta. Since each phase of the supply voltage is connected between two exciting windings the correction voltage supplied from the exciting windings to its associated series windings is not in phase wtih the phase supply voltage. However, this does not change the operation of the system and it operates substantially as the system shown in Fig. 2.

Figure 7:
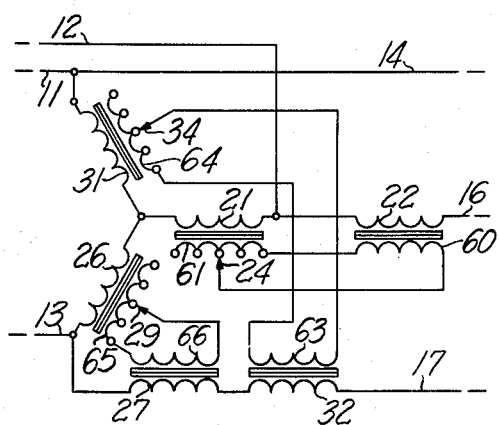
Figure 8:
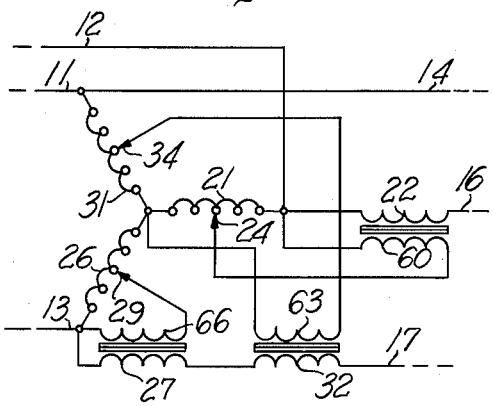

Figs. 7 and 8 show diagrammatically systems similar to that of Fig. 6 in that the exciting windings are star connected. In Fig. 7 the voltage across each series winding is varied by utilizing two auxiliary windings, similar in this respect to the system of Fig. 4. In Fig. 8 the voltage across each series winding is varied by utilizing only one auxiliary winding and connecting the tap switch directly to the exciting winding as explained in the description of Fig. 5.

Figure 9:
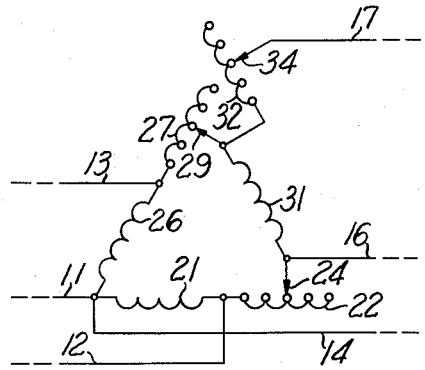

Fig. 9 shows another system which is similar to that shown in Figs. 1 and 2 in that the exciting windings of each regulator are connected in delta. However, in Fig. 9 exciting winding 31 is connected in delta with exciting windings 21 and 26 through series windings 22 and 27. Therefore the correction voltage supplied to series winding 32 is not in phase with the voltage between conductors 12 and 13 but is in phase with the resultant voltage obtained from vectorially adding the voltages across conductors 12 and 13, the voltage across series winding 22 and the voltage across series winding 27.

Figure 10:
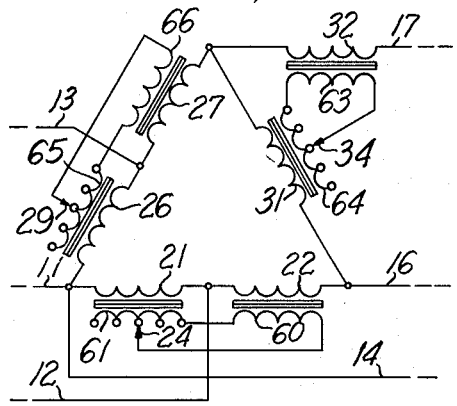
Figure 11:
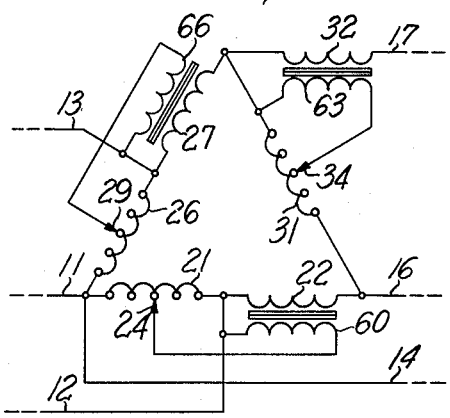

The system shown in Figs. 10 and 11 are similar to that shown in Fig. 9. In Fig. 10 the voltage across each series winding is varied by utilizing two auxiliary windings, similar in this respect to the system of Fig. 4. In Fig. 11 the voltage across each series winding is varied by utilizing one auxiliary winding and connecting the tap switch directly to the exciting winding as was done in the system of Fig. 5. The operation of the systems shown in Figs. 9, 10 and 11 is substantially the same as the operation of the system shown in Figs. 1 and 2.

Figure 12:
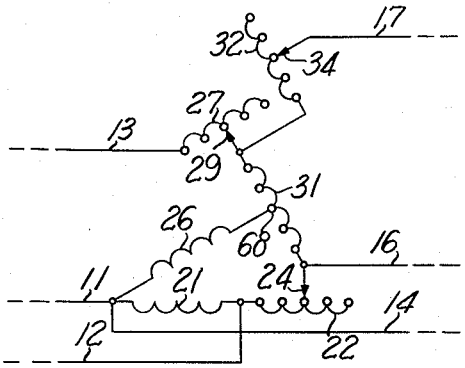

The system shown in Fig. 12 is similar to that shown in Fig. 9 except that one end of exciting winding 26 which is connected to supply conductor 13 is changed so as to connect to a center tap 68 on exciting winding 31. The voltage across exciting winding 26 is in phase with the resultant voltage obtained by adding vectorially the voltage across supply conductors 11, 13, and half the voltage across exciting winding 31. The correction voltage supplied to series winding 27 is in phase with the voltage across exciting winding 26.

The voltage across exciting winding 31 is in phase with the resultant voltage obtained by adding the voltage across conductors 12, 13, the voltage across series winding 22 and the voltage across series winding 27. The correction voltage supplied to series winding 32 is in phase with the voltage across winding 31.

Figure 13:
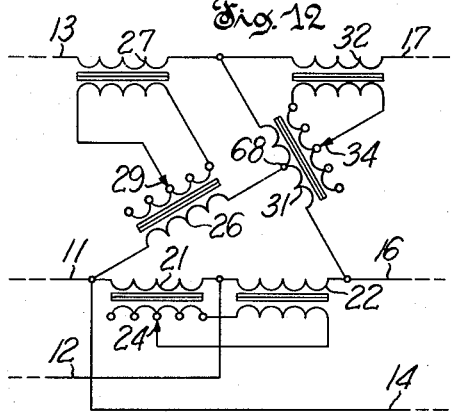
Figure 14:
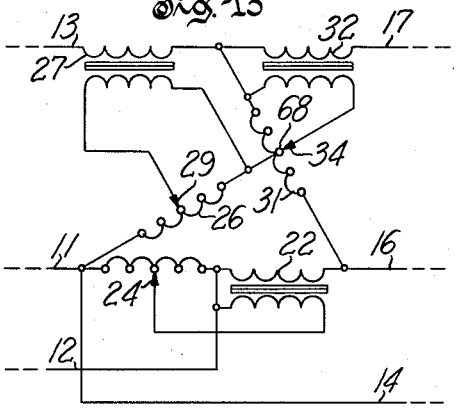

Figs. 13 and 14 show systems similar to that shown in Fig. 12. In Fig. 13 the voltage across each series winding is varied by utilizing two auxiliary windings as shown in the system of Fig. 4. In Fig. 14 the voltage across each series winding is varied by utilizing one auxiliary winding and connecting the tap switch directly to the exciting winding as was done in the system of Fig. 5.

Figure 15:
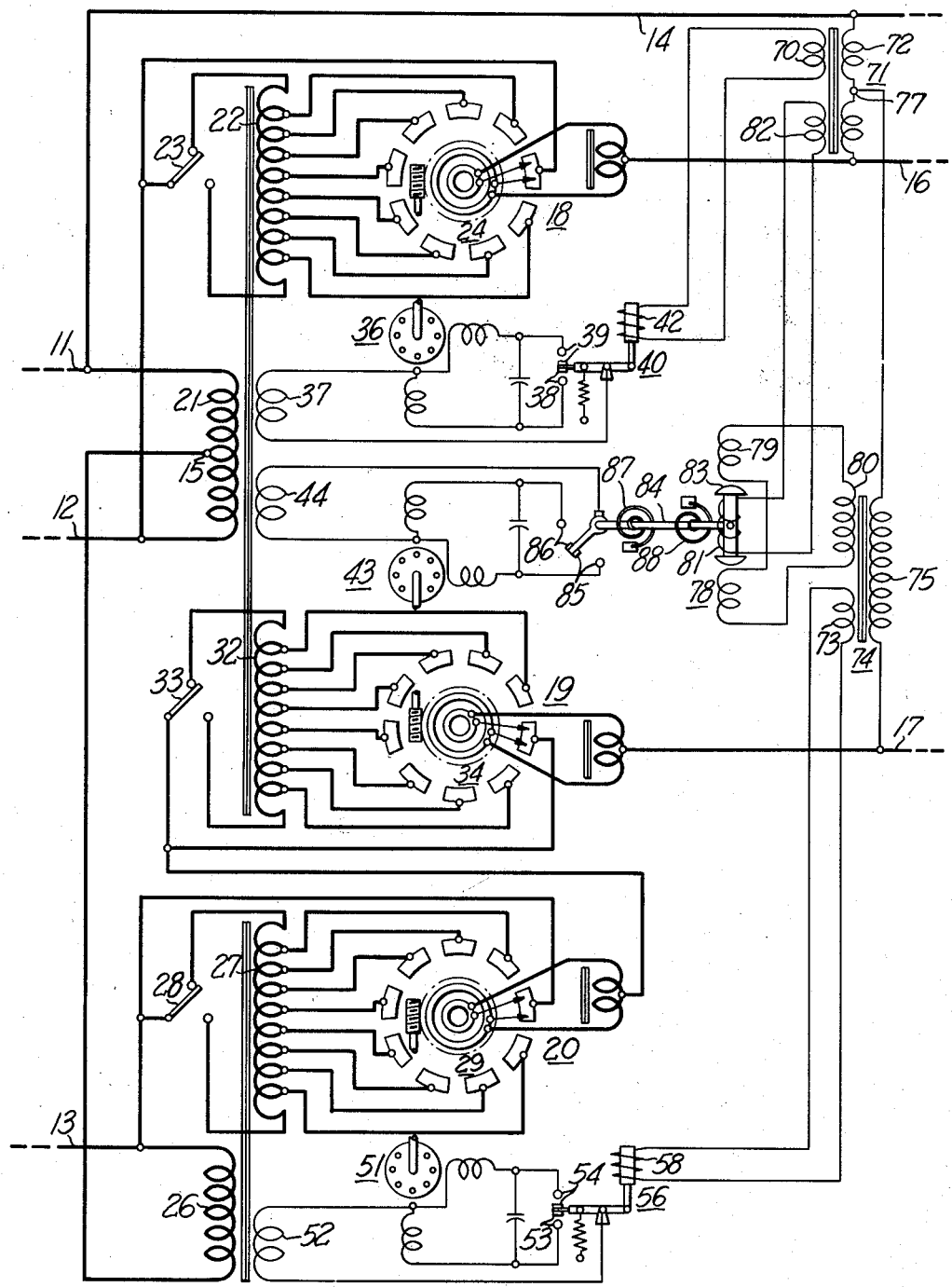
Fig. 15 is a schematic diagram similar to Fig. 1 showing a polyphase T-connected regulator system including a modified control circuit for the system.
Figure 16:
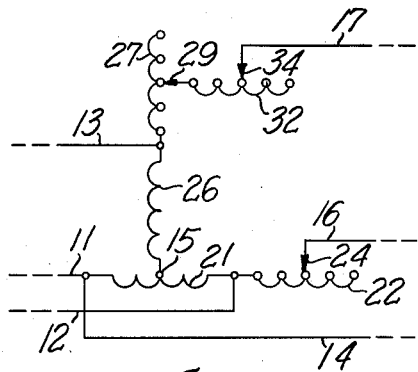
Fig. 16 is a diagrammatic view of the system shown in Fig. 15 with the circuit for automatic operation omitted.

The delta connected system shown in Fig. 1 may be reconnected in a T arrangement as shown schematically in Fig. 15 and diagrammatically in Fig. 16. The main winding of the T-connected system may comprise two exciting windings which are connected together, this connection then being used as a center tap for connecting the teaser winding into the system. Also either of the exciting windings may be used alone for the main winding of the T connection and a center tap provided on this winding for connecting the teaser winding into the system. As shown, in Fig. 15 the system of Fig. 1 is modified by omitting exciting winding 31 and reconnecting the end of exciting winding 26 which is connected to supply connector 11 to a center tap 15 on winding 21. Series winding 32 which was energized from winding 31 is then arranged to be energized from exciting winding 21. The load conductors are connected to the supply conductors in the same manner as shown in Fig. 1.

The arrangement for automatic operation is also modified by including a pair of potential transformers which are T connected. Coil 42 of device 40 which controls the operation of tap switch 24 is connected to secondary winding 70 of potential transformer 71 which has its primary winding 72 connected across load conductors 14 and 16. Coil 58 of device 56 which controls the operation of tap switch 29 is connected to secondary winding 73 of potential transformer 74 which has its primary winding 75 connected between load conductor 17 and center tap 77 of potential transformer 71. Device 56 is set to close at 86% of the desired load voltage, since when the system is balanced the voltage across conductor 17 and center tap 15 of exciting winding 21 in 86% of the voltage across conductors 14, 16.

Device 48 which controls the operation of tap switch 34 is replaced by device 78. Device 78 is an electrodynamic type instrument and has a fixed winding 79 connected to the secondary winding 80 of potential transformer 74 and a movable winding 81 connected to secondary winding 82 of potential transformer 71. Movable member 83 on which winding 81 is disposed has a shaft 84 which operates to selectively close contacts 85 and 86 to cause motor 43 to be energized. Contacts 85 and 86 are returned to the open position by coil springs 87, 88 when the voltages of windings 79 and 81 are displaced 90 degrees.

Figure 17:
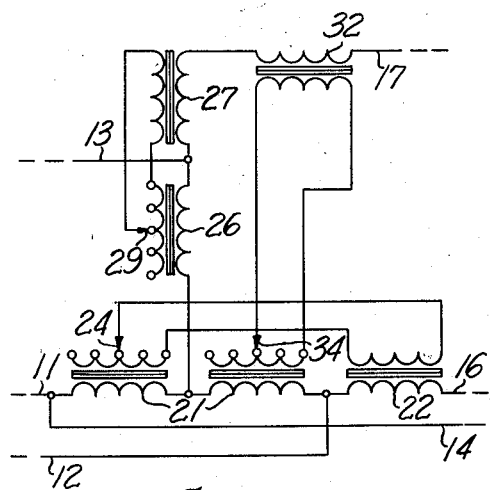
Figs. 17 and 18 are similar to Fig. 16 but show diagrammatically modifications of the system shown in Fig. 15.
Figure 18:
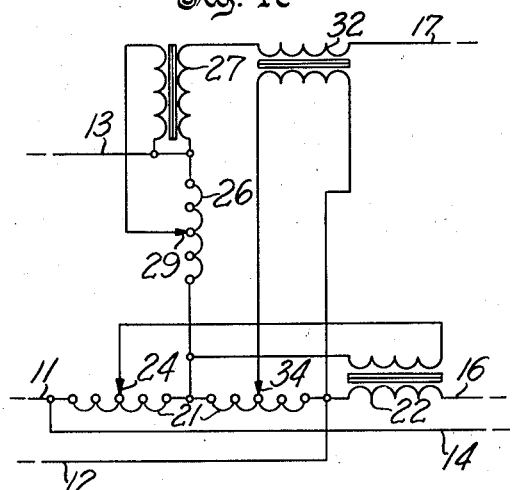

Figs. 17 and 18 show systems similar to the one shown in Figs. 15 and 16. However, in Fig. 17 the voltage across each series winding is varied by utilizing two auxiliary windings as was done in Fig. 4. In Fig. 18 the voltage across each series winding is varied by utilizing one auxiliary winding and connecting the tap switch directly to the exciting windings. The operation of the systems shown in Figs. 15 to 18 is substantially the same as the operation of the system shown in Fig. 1.

Figure 19:
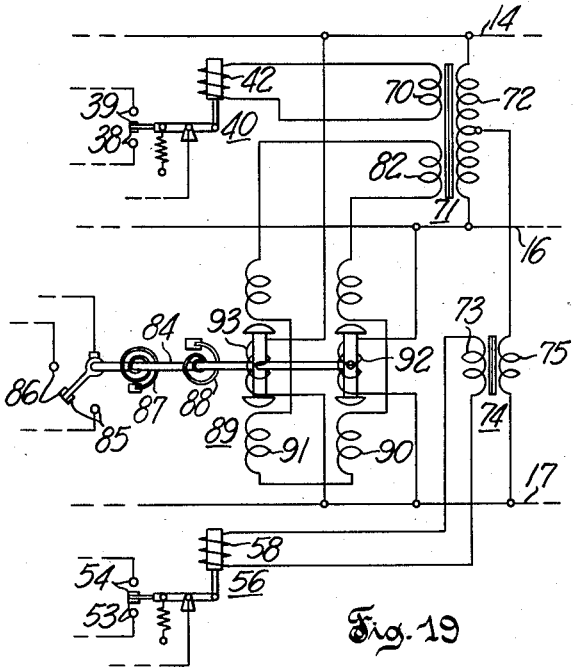
Figs. 19 and 20 show schematically modifications of the circuit for automatic operation shown in Fig. 15.

Fig. 19 shows a modification of device 78 used to control the operation of tap switch 34 of the system shown in Fig. 15. Device 89 has a first fixed winding 90 and a second fixed winding 91 connected in series to secondary winding 82 of potential transformer 71. Movable winding 92 is connected across load conductors 16 and 17, and movable winding 93 is connected across load conductors 14 and 17. The torque produced on shaft 84 from the interaction of windings 92 and 90 is in the opposite direction to the torque produced on shaft 84 by interaction of windings 91 and 93. Contacts 85 and 86 will therefore remain open as long as the voltages across load conductors 16 and 17, and 14 and 17 are equal.

Figure 20:
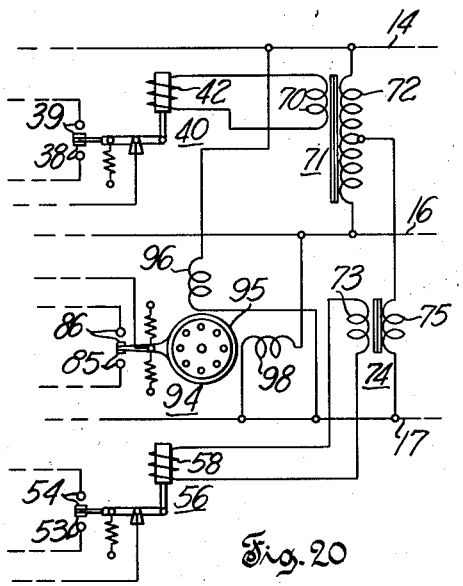

Fig. 20 shows another modification of the electro-responsive devices used for automatic operation of the system shown in Fig. 15. Device 78 which controls the operation of tap switch 34 is replaced by device 94. Device 94 has a member 95 which is movable in one direction in response to the voltage supplied to winding 96 connected across load conductors 14 and 17. Member 95 is movable in the other direction in response to the voltage supplied to winding 98 connected across conductors 16 and 17. When the magnitude of the voltage across conductors 14 and 17 is equal to the magnitude of voltage across conductors 16 and 17 the torques produced on member 95 are equal and opposite and contacts 85 and 86 are in the open position as shown. When these voltages are different member 95 moves to selectively close either contacts 85 or 86 depending on the voltage difference between these two windings.

Although but a few embodiments of the present invention have been illustrated and described it will be apparent to those skilled in the art that other modifications may be made without departing from the spirit of the invention or from the scope of the appended claims.

It is claimed and desired to secure by Letters Patent:

1. In a regulating system connecting a three phase supply circuit having first, second and third conductors to a three phase load circuit having first, second and third conductors for regulating each phase voltage of said three phase load circuit to a predetermined value independent of variations of the voltage of said supply circuit, the combination of regulator means having exciting winding means, first, second and third series windings inductively related to said exciting winding means, and means to vary the voltages of said series windings, means connecting said exciting winding means to said supply conductors to cause the voltages of at least said second and third series windings to be of different phases, means directly connecting said first load conductor to said first supply conductor, means connecting said second load conductor to said second supply conductor through said first series winding whereby a change in voltage of said first series winding changes the voltage between said first and second load conductors and between said second and third load conductors, and means connecting said third load conductor to said third supply conductor through said second and third said series windings whereby a change in voltage of said second and third said series windings changes the voltage between said first and third load conductors and said second and third load conductors.

2. In a regulating system connecting a three phase supply circuit having first, second and third conductors, to a three phase load circuit having first, second and third conductors for regulating each phase voltage of said three phase load circuit to a predetermined value independent of the variation of the voltage of said supply circuit, the combination of regulator means comprising a first regulator, a second regulator, and a third regulator, each said regulator having an exciting winding, a series winding inductively related to said exciting winding, and means to vary the voltage across said series winding comprising a tap switch, means connecting said exciting winding of each regulator to one of said supply conductors to cause the voltage of said series windings of at least said second and third regulators to be of different phases, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

3. In a regulating system connecting a three phase supply circuit having first, second and third conductors, to a three phase load circuit having first, second and third conductors for regulating each phase voltage of said three phase load circuit to a predetermined value independent of the variation of the voltage of said supply circuit, the combination of regulating means comprising a first regulator, a second regulator, and a third regulator, each said regulator having an exciting winding, a series winding inductively related to said exciting winding, means to vary the voltage across said series winding comprising a tap switch, and an electroresponsive device connected between two of said load conductors to actuate said switch in response to a change in condition between said two said load conductors, means connecting said exciting winding of each regulator to one of said supply conductors to cause the voltages of said series windings of at least said second and third regulators to be of different phases, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

4. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulator means comprising a first regulator, a second regulator, and a third regulator, each said regulator having an exciting winding, a series winding inductively related to said exciting winding, means to vary the voltage across said series winding comprising a tap switch, and an electroresponsive device connected between two or said load conductors to actuate said switch in response to a change in condition between said two said load conductors, said exciting windings of said regulators being connected in delta to said supply conductors, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

5. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulator means comprising a first regulator, a second regulator, and a third regulator, each said regulator having an exciting winding, a series winding inductively related to said exciting winding, means to vary the voltage across said series winding comprising a tap switch, and an electroresponsive device connected between two of said load conductors to actuate said switch in response to a change in condition between said two said load conductors, said exciting windings of said regulators being connected in star to said supply conductors, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

6. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulator means comprising a first regulator, a second regulator, and a third regulator, each said regulator having an exciting winding, a series winding inductively related to said exciting winding, means to vary the voltage across said series winding comprising a tap switch, and an electroresponsive device connected between two of said load conductors to actuate said switch in response to a change in condition between said two said load conductors, means connecting said exciting windings of said regulators to said supply conductors with said exciting winding of one of said regulators being connected between two of said supply conductors through said series windings of the other two said regulators, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

7. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulator means comprising a first regulator, a second regulator, and a third regulator, each said regulator having an exciting winding, a series winding inductively related to said exciting winding, means to vary the voltage across said series winding comprising a tap switch, and an electroresponsive device connected between two of said load conductors to actuate said switch in response to a change in condition between said two said load conductors, means connecting said exciting windings of said regulators to said supply conductors with said exciting winding of one of said regulators having a center tap connected to said first supply conductor through said exciting winding of another said regulator, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage in said series winding of said second and third regulators changes the voltage between said first and third load conductors and said second and third load conductors.

8. In a regulating system connecting a three phase supply circuit having first, second and third conductors to a three phase load circuit having first, second and third conductors, for regulating each phase voltage of said three phase load circuit to a predetermined value independent of the variation of the voltage of said supply circuit the combination of regulator means comprising a first regulator, a second regulator, and a third regulator, each said regulator having an exciting winding, a series winding inductively related to said exciting winding, means to vary the voltage across said series winding comprising a plurality of taps on said series winding, and a tap switch, and an electroresponsive device connected between two of said load conductors to actuate said switch in response to a change in condition between said two said load conductors, said exciting windings of said regulators being connected in delta to said supply conductors, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor connected to said third supply conductor through said series windings of said second and third regulators whereby a change in voltage of said series winding of said second and third regulators changes the voltages between said first and third load conductors and said second and third load conductors.

9. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination regulating means comprising a first regulator, a second regulator, and a third regulator, each said regulator having an exciting winding, a series winding inductively related to said exciting winding, means to vary the voltage across said series winding comprising a plurality of taps on said series winding, and a tap switch, and an electroresponsive device connected between two of said load conductors to actuate said switch in response to a change in condition between said two said load conductors, said exciting windings of said regulators connected in star to such supply conductors, means connecting said first load conductor to said first suply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third reglautors changes the voltage between said first and third load conductors and said second and third load conductors.

10. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulating means comprising a first regulator, a second regulator, and a third regulator, each said regulator having an exciting winding, a series winding inductively related to said exciting winding, means to vary the voltage across said series winding comprising a plurality of taps on said series winding and a tap switch, and an electroresponsive device connected between two of said load conductors to actuate said switch in response to a change in condition between said two said load conductors, means connecting said exciting windings of said regulators to said supply conductors with said exciting winding of one of said regulators being connected between two of said supply conductors through said series windings of the other two said regulators, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

11. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulating means comprising a first regulator, a second regulator, and a third regulator, each said regulator having an exciting winding, a series winding inductively related to said exciting winding, means to vary the voltage across said series winding comprising a plurality of taps on said series winding, and a tap switch, and an electroresponsive device connected between two of said load conductors to actuate said switch in response to a change in condition between said two said load conductors, said exciting windings of said regulators connected in mesh to said supply conductors with said exciting winding of one of said regulators having a center tap connected to said first supply conductor through said exciting winding of another regulator, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

12. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit, the combination of regulator means comprising first and second exciting windings, first, second and third series windings inductively related to said exciting windings, and means to vary the voltages across said series windings comprising a plurality of taps on said series windings and tap switches, T-connected potential transformers connected to said load conductors, and electroresponsive devices connected to said transformers operable to actuate said switches in response to changes in conditions of said load conductors, one of said devices comprising an electrodynamometer having a first coil connected to one of said potential transformers and a second coil connected to the other said potential transformer, one of said coils being movable in response to said condition change to cause said device to actuate one of said switches to vary the voltage across said third series winding, means connecting said exciting windings to said supply conductors in T arrangement to cause voltages of at least said second and third series windings to be of different phases, means directly connecting said first load conductor to said first supply conductor, means connecting said second load conductor to said second supply conductor through said first series winding whereby a change in voltage of said first series winding changes the voltage between said first and second load conductors and between said second and third load conductors, and means connecting said third load conductor to said third supply conductor through said second and third said series windings whereby a change in voltage of said second and third said series windings changes the voltage between said first and third load conductors and said second and third load conductors.

13. In a regulating system connecting a three phase supply circuit having first, second and third conductors to a three phase load circuit having first, second and third conductors for regulating each phase voltage of said three phase load circuit to a predetermined value independent of the variation of the voltage of said supply circuit the combination of regulating means comprising a first regulator, a second regulator, and a third regulator, each said regulator having an exciting winding, a series winding inductively related to said exciting winding, means to vary the voltage across said series winding comprising a plurality of taps on said series winding, and a tap switch, and an electroresponsive device connected between two of said load conductors to actuate said switch in response to a change in condition between said two said load conductors, said exciting windings of said regulators being connected in T arrangement to said supply conductors, means directly connecting said first load conductor to said first supply conductor, means connecting said second load conductor to said second supply conductor through said series winding of said first regulator whereby a change in voltage of said series winding of said first regulator changes the voltage between said first and second load conductors and between said second and third load conductors, and means connecting said third load conductor to said third supply conductor through said series windings of said second and third regulators whereby a change in voltage of said series winding of said second and third regulators changes the voltage between said first and third load conductors and said second and third load conductors.

14. In a regulating system connecting a three phase supply circuit having first, second and third conductors to a three phase load circuit having first, second and third conductors for regulating each phase voltage of said three phase load circuit to a predetermined value independently of the variation of the voltage of said supply circuit, the combination of regulator means comprising first and second exciting windings, first, second and third series windings inductively related to said exciting windings, and means to vary the voltages across said series windings comprising tap switches, T-connected potential transformers connected to said load conductors, and electro-responsive devices connected to said transformers operable to actuate said switches in response to changes in conditions of said load conductors, means connecting said exciting windings to said supply conductors in T arrangement to cause voltages of at least said second and third series windings to be of different phases, means directly connecting said first load conductor to said first supply conductor, means connecting said second load conductor to said second supply conductor through said first series winding whereby a change in voltage of said first series winding changes the voltage between said first and second load conductors and between said second and third load conductors, and means connecting said third load conductor to said third supply conductor through said second and third said series windings whereby a change in voltage of said second and third said series windings changes the voltage between said first and third load conductors and said second and third load conductors.

No references cited.